Jan. 12, 1971     K. A. FOWLER     3,555,412
PROBE FOR DETECTION OF SURFACE CRACKS IN METALS
UTILIZING A HALL PROBE
Filed Nov. 26, 1968     2 Sheets-Sheet 1
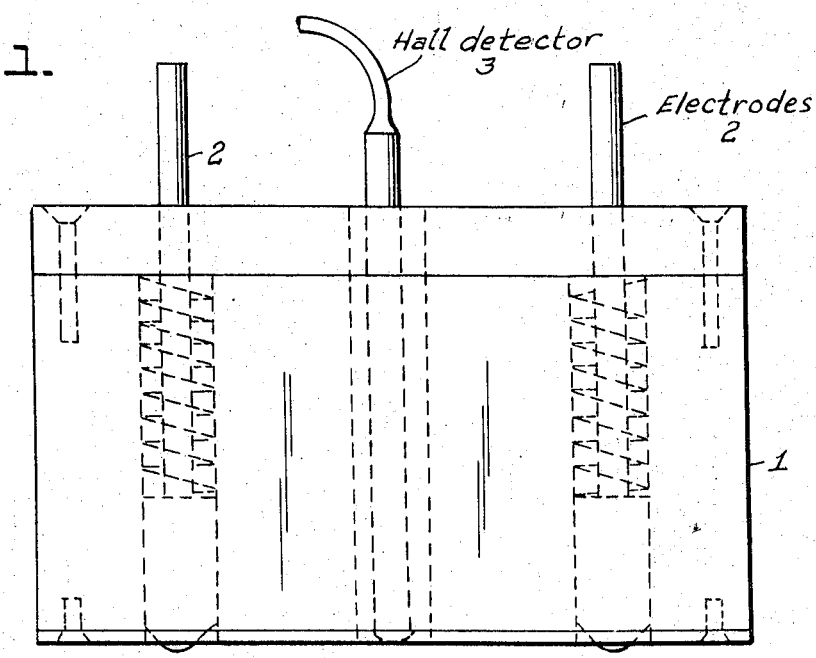
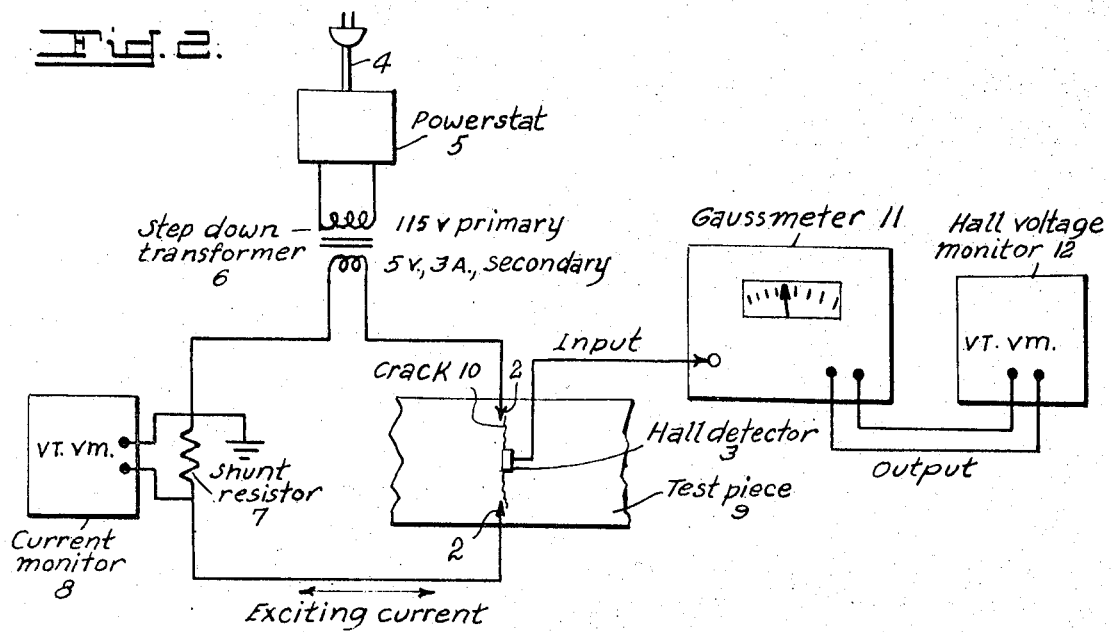
INVENTOR,
Kenneth A. Fowler
BY: Harry M. Saragovitz,
Edward J. Kelly &
R. P. Gibson     ATTORNEYS Calibration curve of Gaussmeter output versus depth of 20 mil wide slots milled in ½ inch thick 1020 steel plate Calibration curve of Gaussmeter Output versus depth of 20 mil wide slots milled in ½ inch thick brass plate.

INVENTOR,
Kenneth A. Fowler

BY: Harry M. Saragovitz,
Edward J. Kelly &
R. P. Gibson

ATTORNEYS

3,555,412
PROBE FOR DETECTION OF SURFACE CRACKS IN METALS UTILIZING A HALL PROBE

Kenneth A. Fowler, Medfield, Mass., assignor to the United States of America as represented by the Secretary of the Army
Filed Nov. 26, 1968, Ser. No. 779,026
Int. Cl. G01r 33/12
U.S. Cl. 324—37     7 Claims

ABSTRACT OF THE DISCLOSURE

A Hall effect detector is mounted between a pair of electrodes. The electrodes are moved along a current conducting surface having a crack, or suspected of having a crack or other flaw. The crack alters the flow of current and channels it between the electrodes thereby increasing the magnetic field in the area of the crack. The magnitude of the increase of the magnetic field indicates the size of the crack or flaw. The direction of the crack also affects the magnitude of the change. Therefore, the direction of the crack, as well as its depth and length, can be ascertained by probing with the present instrument, as taught herein.

---

The invention described herein may be manufactured, used, and licensed by or for the Government for governmental purposes without the payment to me of any royalty thereon.

BACKGROUND

This invention is the result of a need for apparatus for electronically detecting and measuring the amplitude of leakage fields around surface cracks in steel and other materials. Static magnetization methods have been used in the past but they have an inherent limitation because the level of magnetization is difficult to control and impossible to measure under many conditions. Further, magnetization requires a separate operation that is often cumbersome and time consuming.

It is an object of this invention to provide apparatus and a method of operation combining localized magnetization and detection of variations of magnetization in localized areas to thereby locate cracks or other flaws, and to determine the depth and direction of the cracks. The apparatus is usable in local, relatively inaccessible areas.

IN THE DRAWING

FIG. 1 is a diagrammatic representation of the probe assembly;

FIG. 2 is a circuitry diagram for the overall testing unit;

Figure 3:
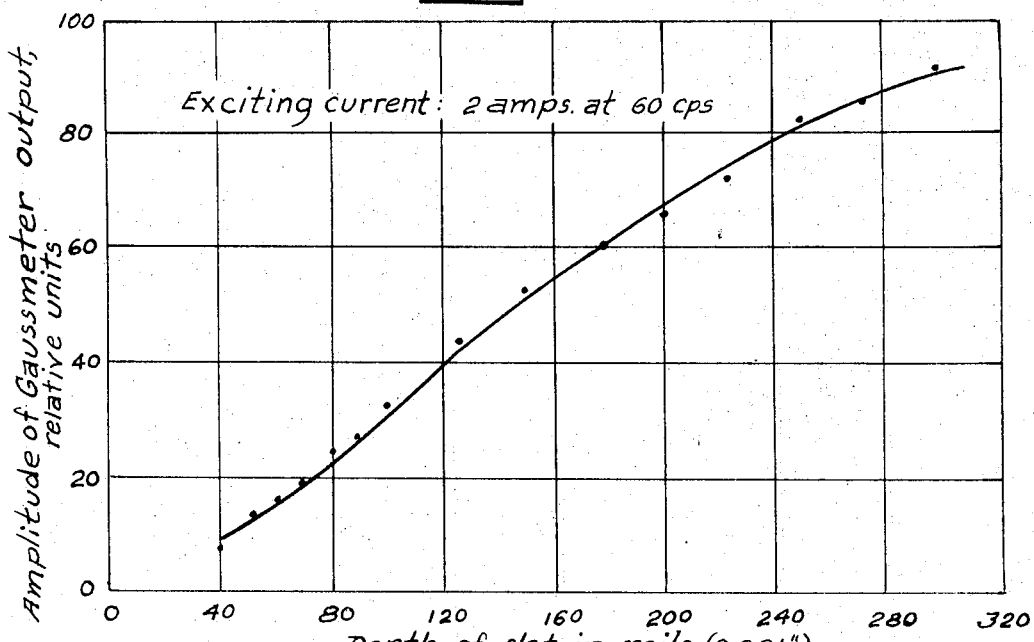
FIGS. 3 and 4 are graphical representations of exemplary results obtained by use of the present invention.

Body 1 may be made of an electrically insulating material such as plastic. Electrodes 2 may be made of an electrically conductive material and spring pressed to project slightly below the base of body 1. A Hall detector 3, as described in the pamphlet entitled "The Hall Effect and Its Application," by F. W. Bell, Inc., Columbus, Ohio, is preferably mounted substantially midway between electrodes 2 and slightly offset from the centerline between electrodes 2, as illustrated in FIG. 2. The detector 3 is preferably of the axial type, which is sensitive to components of the magnetic field normal to the surface and having its axis generally normal to the surface and being located approximately midway between the electrodes and slightly offset from the line connecting said electrodes.

In FIG. 2, leads 4 supply power to powerstat 5 and stepdown transformer 6, which may have an output of 5 volts at 3 amperes, for example. The transformer output is fed to electrodes 2, preferably having in series therewith shunt resistor 7 and current monitor 8. Electrodes 2 will be brought into contact with test piece 9 at points spaced along the length of an apparent or suspected crack 10 in a manner described hereinafter.

Figure 4:
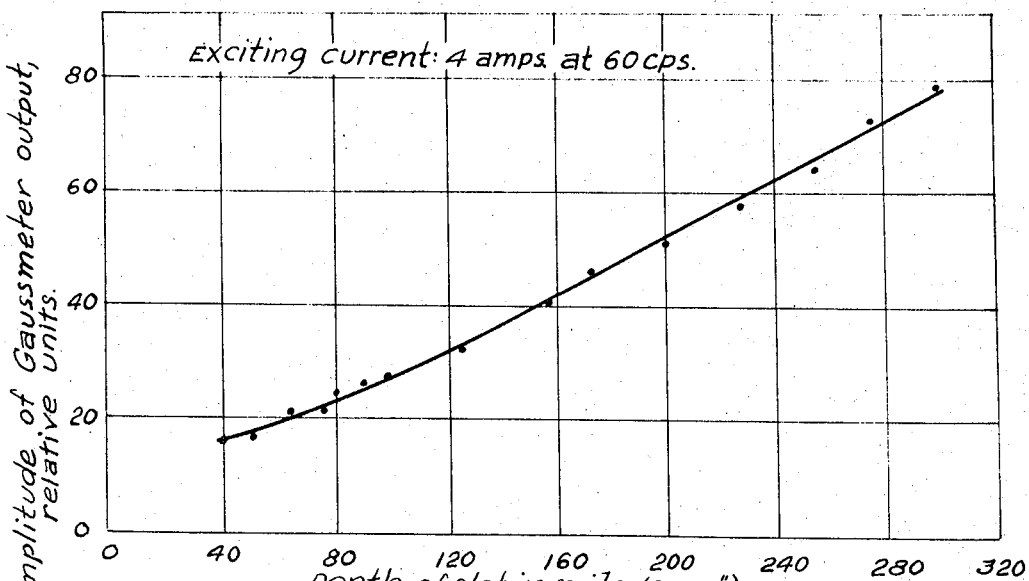

The well known Hall detector 3 (magnetic field detector), generates an output (input) to gaussmeter 11 which, in turn, has an output (input) to Hall voltage monitor 12. The detector detects the magnitude of the normal component of the magnetic leakage field by means of the Hall voltage generated as a result of that field. The normal component of the magnetic leakage field is proportional to factors such as the depth of a crack in a metal being examined. FIGS. 3 and 4 are illustrative of this effect. The Hall detector is preferably offset slightly from a line extending between electrodes 2 and is preferably substantially equidistantly spaced from each electrode. This yields better results.

OPERATION

Electrodes 2 carry an electrical current to the surface of material 9 to be tested. Current flowing between the electrodes along the surface of the metal sets up a magnetic field, alternately building up, collapsing and reversing magnetic polarity as the alternating current builds up, collapses, and reverses electrical polarity. The current is determined by measuring the voltage drop across shunt resistor 7 with a vacuum tube voltmeter 8. If no crack or other discontinuity is present the normal component of the leakage field produced by the current (or of the flux induced by that field in ferromagnetic materials) is very weak and little or no signal is shown by the Hall voltage monitor. If a crack does exist in the vicinity of electrodes 2 leakage fields are established which have components normal to the surface of the test piece and a voltage is shown on the Hall voltage monitor. The probe is then carefully adjusted until the maximum amplitude test indication is achieved.

Importantly, the most sensitive indication is achieved by use of A.C., not D.C., and with the current flowing along the crack, not transverse to it. If direct current were used a static field would be produced that, in the case of ferromagnetic materials, could be quite small in comparison to the residual magnetization that may be present. By using alternating current only the A.C. component of the total leakage field is measured and the influence of variations in residual magnetization is effectively suppressed. If the current were directed at right angles to the crack the current path would be forced deeper into the test piece with the leakage field thereby decreasing near the surface where the detector is located. By directing the current flow along the length of the crack the flux induced into a ferromagnetic steel test piece intercepts the crack at right angles and a greater leakage field is established at the crack than in a defect free area.

As illustrated in FIGS. 3 and 4, graphs or charts may be prepared to indicate the presence of cracks in various materials when the apparatus gives certain readings. The magnitude and extent of the cracks can be ascertained by proper probing and monitoring of the output and comparing the output with the calibrated or computed output for certain size cracks.

I claim:

1. Apparatus for detecting a crack in a material comprising a pair of spaced electrodes, means to feed an electrical current to said electrodes to supply an electrical current to a material in a localized area to produce a magnetic field between said electrodes, a Hall effect magnetic field detector offset from a line between said electrodes, said detector being of the axial type and having its sensitivity axis extending substantially normal to the surface of the material, and means to monitor the output from said detector to indicate the interference to electrical current flow due to a crack in said material.

2. Apparatus as in claim 1 and an insulating body member supporting said spaced electrodes and detector to serve as a probe and detector.

3. Apparatus as in claim 1 and means to monitor the current supplied to said electrodes.

4. The method of detecting a crack in a material comprising the steps of applying an electrical current to a localized area of the material to flow in a path through the material and to generate an electromagnetic field about said path, locating a Hall effect magnetic field detector adjacent to said path of current flow and with its sensitivity axis extending substantially normal to the surface of the material to detect the intensity of the magnetic field, and comparing the indicated intensity with a standard intensity to determine whether a crack or other flaw in the material is partially interrupting the flow of current and magnetic field generation.

5. The method of claim 4 wherein the step of applying the current is accomplished by pressing a pair of electrodes to the surface of the material at closely spaced points and the step of detecting the magnetic field is accomplished by placing a detector adjacent to the surface at a location offset from a line between the electrodes.

6. The method of claim 5 including the step of probing with the electrodes to obtain a maximum reading when the electrodes and path of current flow therebetween are generally parallel with a crack or other flaw in the material.

7. The method of claim 4 including the step of applying an alternating current (A.C.) to a localized area of the material to obtain a magnetic field which has greater sensitivity to the presence of a crack than may be obtainable with a direct current (D.C.).

References Cited

UNITED STATES PATENTS 1,998,952  4/1935  Edgar et al. _____ 324—37

FOREIGN PATENTS 822,210  10/1959  Great Britain _____ 324—45

OTHER REFERENCES

McMaster, R. C.: Nondestructive Testing Handbook, vol. II, the Ronald Press, New York, 1963, pp. 34.20, 34.21 and 35.2.

RUDOLPH V. ROLINEC, Primary Examiner

R. J. CORCORAN, Assistant Examiner

U.S. Cl. X.R.

324—45